United States Patent [19]

Jeong

[11] Patent Number: 5,095,457
[45] Date of Patent: Mar. 10, 1992

[54] DIGITAL MULTIPLIER EMPLOYING CMOS TRANSISTORS

[75] Inventor: Ho-sun Jeong, Taegu, Rep. of Korea

[73] Assignee: Samsung Electronics Co., Ltd., Kyunggi-do, Rep. of Korea

[21] Appl. No.: 473,633

[22] Filed: Feb. 1, 1990

[30] Foreign Application Priority Data

Feb. 2, 1989 [KR] Rep. of Korea ............ 89-1368

[51] Int. Cl.$^5$ .............................................. G06F 7/52
[52] U.S. Cl. ................................. 364/758; 364/715.09
[58] Field of Search ......................... 364/758, 715.09

[56] References Cited

U.S. PATENT DOCUMENTS

| | | | |
|---|---|---|---|
| 3,346,729 | 10/1967 | Dell et al. | 364/758 |
| 3,603,776 | 9/1971 | Weinberger | 364/715.09 |
| 3,675,001 | 7/1972 | Singh | 364/715.09 |
| 3,723,715 | 3/1973 | Chen et al. | 364/715.09 |
| 3,795,880 | 3/1974 | Singh et al. | 364/758 |
| 4,607,176 | 8/1986 | Burrows et al. | 364/715.09 |
| 4,891,782 | 1/1990 | Johnson | 364/786 |
| 5,016,211 | 5/1991 | Jeong | 364/786 |

OTHER PUBLICATIONS

Crosthwait et al., "Column Toter PLA" *IBM Tech. Disclosure Bulletin*, vol. 22, No. 6 Nov. 1979, pp. 2339-2341.

*Primary Examiner*—David H. Malzahn
*Attorney, Agent, or Firm*—Cushman, Darby & Cushman

[57] ABSTRACT

A digital multiplier for multiplying a binary N bit multiplicand by a binary N bit multiplier. The digital multiplier comprises a plurality of AND gates in which each digit of the mutliplicand is multiplied by each digit of the multiplier. The outputs of the AND gates represent partial products which are then arranged corresponding to each digit of the multiplier. The digital multiplier further comprises a plurality of 1's counters for receiving in parallel all partial products, except the least significant digit of the multiplier, and any carries propagated from an adjacent counter, and for counting the number of "1" in the resultant values. The 1's counters output the least significant bit as the final products, and propagate the remaining bits to the next 1's counter.

14 Claims, 3 Drawing Sheets

DIGITAL MULTIPLIER EMPLOYING CMOS TRANSISTORS

BACKGROUND OF THE INVENTION

1. Field of the Invention

This invention relates to generally a digital multiplier and more particularly to a novel digital multiplier which is designed by using the neural network to simplify the network architecture and its circuits and to enhance its processing speed.

2. Description of the Prior Art

Recently, it has been gradually recognized that a typical digital computer having VON NEUMANN architecture is not suitable for a process requiring composite judgements or higher intellectual faculties despite a rapid development of the processing speed.

Furthermore, it is well known that the human brain allows the data to be processed in parallel type with associative memory and is also capable of recognition and memory from the partial information.

Accordingly, research involving so called neural computers which operate by imitating the parallel processing and associative memory concepts has been widely pursued all over the world.

In 1982, J. J. Hopfield proposed a neural network model which imitates the associative memory processing system of human brain, where the neural network is substituted with an anolog circuit and constructed with hardware using VLSI techniques (J. J. Hopfield, Proc. Nat'l. Acad. Sci. U.S.A., Vol. 79, P.P 2554–2558, April 1982).

Also, in 1986, J. J. Hopfield disclosed a model for solving the optimization problem and suggested a A/D converter as one example thereof. (D. W. Tank and J. J. Hopfield, IEEE Transactions on circuits and systems, Vol. CAS-33, No. 5, May 1986).

However, the above-mentioned A/D converter circuit has a drawback in that the A/D converter circuit becomes unstable due to the production of two local minimal values producing in the circuit.

For this reason, the A/D converter circuit should be provided with a separate compenstating circuit for stablization thereof.

On the other hand, in the typical digial multiplier, the binary multiplicand is multiplied in turn by each digit and these partial products are then added corresponding to each digit of the multiplier, so that an algorithm to obtain the final products is prosecuted.

At this time, the products have 2N bit, where the multiplicand having the binary N digits is multiplied by multiplier having N digits.

In order to implement the multiplication algorithm based upon VON NEUMANN concept, that is, the logic circuit concept, the serial multiplier and parallel multiplier are known.

However, the serial multiplier is relatively slow in the multiplier processing speed. The parallel multiplier has a multiplier processing speed faster than that of the serial multiplier, but has a drawback that it occupies a large area in the integrated circuit due to its complex circuit.

SUMMARY OF THE INVENTION

The object of the present invention is to provide a digital multiplier circuits in which the circuit construction is simpler and the processing speed is faster than the prior art.

Another object of the invention is to provide a digital multiplier using a novel neural network of unidirectional feedback type (UFT).

For achieving the above-mentioned objects, the digital multiplier in which the binary N bits multiplicand are multiplied by the binary N bits multiplier according to the present invention comprises a plurality of partial products means in which the multiplicand is multiplied in turn by each digit of the multiplier and these partial products are then arranged corresponding to each digit of the multiplier, and a plurality of 1's counter means for inputting in parallel the partial products corresponding to each digit excepting the least significant digit of the multiplier and carries propagated from the lower digit and for counting the number of "1" in the resultant values, and providing the least significant bit as the final products, and propagating the remaining bits into the MSB carries.

The 1's counter is constructed by the UFT neural network, which is defined by the following input/output transfer function:

$$Voi = \sum_{j=1}^{n} Tij \cdot Vj + \sum_{k=1}^{m} Tik \cdot Vk + 1 - 2^{i-1}$$

where

Vj represents input voltage,

Vk represents output voltage,

Tij represents a connecting weight between a jth input and an ith neuron and is constant as a weighting value "1", and Tik represents a connecting weight which is fedback into an ith neuron of the kth output and is determined as follows:

$$Tik = \begin{bmatrix} -2^{k-1} & (\text{if } k > i) \\ 0 & (\text{if } k \leq i) \end{bmatrix}$$

The value $1-2^{i-1}$ indicates a biasing connecting weight of the ith neuron.

In the preferred embodiment, according to the invention, the connecting weight is set as a conductance value of MOS transistor, whereby Tij and 1 are constituted by PMOS, and Tik and $2^{i-1}$ are constituted by NMOS, respectively.

The foregoing and other objects, features and advantage of the invention will be apparent from the following description of a preferred embodiment of the invention, as illustrated in the accompanying drawings.

DESCRIPTION OF THE PREFERRED EMBODIMENT

Generally, the calculation process using a paper and pencil involves arranging in order the multiplication terms of two numbers which are to be multiplied and adding a plurality of output carries generated at this time to the next stage.

That is, if an adder is designed to obtain the inputs of the desired numbers and the output carries, the processing speed may be very fast speed compared with the conventional alculation.

For example, if a multiplication of binary numbers of 5×5 digital multiplier is multiplied using the calculating form which utilize the paper and pencil, the multiplication process is as follows;

TABLE 1

| | | | | | | | | | | |
|---|---|---|---|---|---|---|---|---|---|---|
| Multiplicand | | | | | | 1 | 1 | 1 | 1 | 1 |
| Multiplier | | | | | | 1 | 1 | 1 | 1 | 1 |
| Partial | | | | | | 1 | 1 | 1 | 1 | 1 |
| products | | | | | 1 | 1 | 1 | 1 | 1 | |
| | | | | 1 | 1 | 1 | 1 | 1 | | |
| | | | 1 | 1 | 1 | 1 | 1 | | | |
| | | 1 | 1 | 1 | 1 | 1 | | | | |
| Carries | | | | | | 0 | 1 | | | |
| | | | | | 1 | 0 | | | | |
| | | | | 1 | 0 | | | | | |
| | | | 1 | 1 | | | | | | |
| | | 1 | 1 | | | | | | | |
| | 1 | 0 | | | | | | | | |
| | 0 | 1 | | | | | | | | |
| 0 | 1 | | | | | | | | | |
| Product | 1 | 1 | 1 | 1 | 0 | 0 | 0 | 0 | 0 | 1 |
| | $P_9$ | $P_8$ | $P_7$ | $P_6$ | $P_5$ | $P_4$ | $P_3$ | $P_2$ | $P_1$ | $P_0$ |

In the above table 1, it is considered that all inputs are "1" for generation of carries in the each case.

As shown in the multiplication process of the table 1, the 2-bit carry which is generated by the sum of each product and carries from the previous stages is added to the next stage, so that after carry-generating the remaining value became the final output.

A bit to which the most number of inputs are added is the P4 stage and at this stage, a total of 7 values (1,1,1,1,1,1,0) are added.

Therefore, the 1's counter which counts the number of "1" from the 7 inputs is required to obtain the output of P4 stage.

For the other stages, the size of the 1's counter is determined by the number of partial products and carries.

Figure 1:
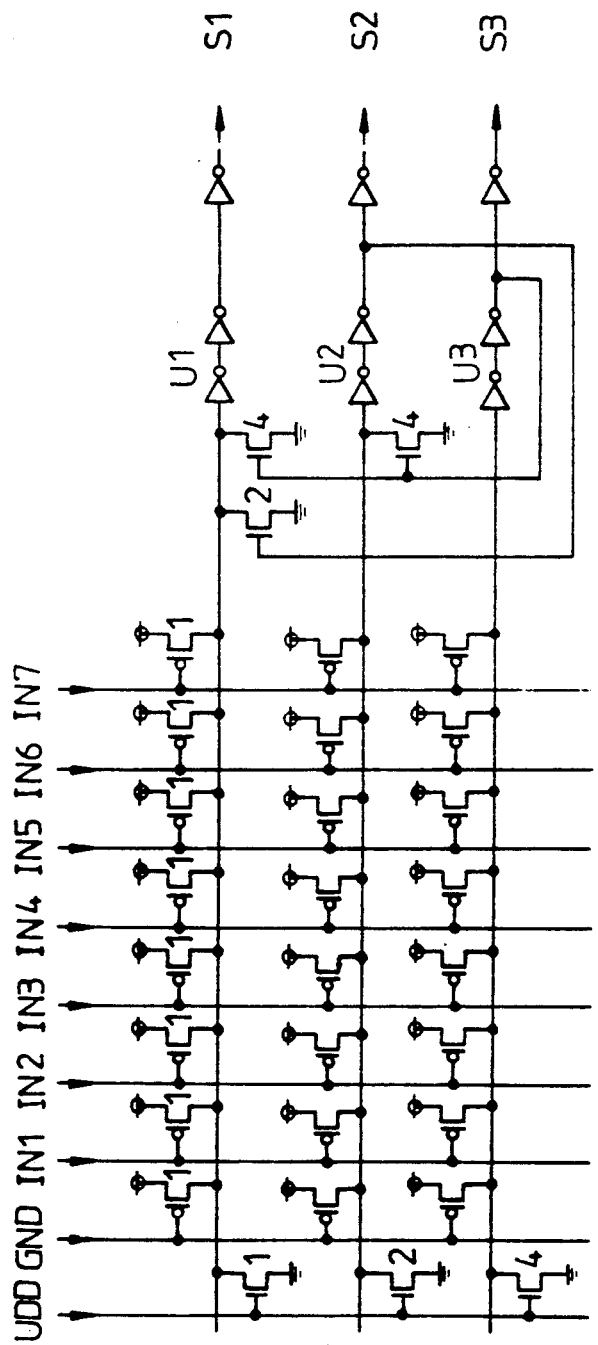
FIG. 1 shows the 1's counter of the digital multiplier according to the present invention, FIG. 2 shown the input wave form of the 1's counter shown in FIG. 1.

An example of a 7 to 3 1's counter which is designed according to the UFT neural model, for use in a 5×5 digital multiplier is shown in FIG. 1.

Referring to FIG. 1, the input terminals IN1 to IN7 of the 1's counter are connected to the gates of PMOS transistors. The sources of the PMOS transistors are coupled to first power source VDD and the drains are coupled to respective input lines L1 to L3 of amplifiers (or neuron units) U1 to U3.

The amplifier comprises two CMOS inverters which are connected in series.

Biasing PMOS and NMOS transistors, have drains connected to respective input lines L1-L3. Each biasing PMOS transistor has a gate connected to the 2nd power source (ground voltage or 0 V) and a source connected to the 1st power source (VDD). Each biasing NMOS transistor has a gate connected to the 1st power source and a source connected to the 2nd power source.

In addition, the outputs of the amplifiers U2 and U3 for the MSB outputs are fed back through NMOS transistors to the input lines of the amplifiers U1 and U2 for the LSB outputs. Each of these NMOS transistors has a gate coupled to the output of an amplifier for the higher significant outputs, a source coupled to the 2nd power source and a drain coupled to the input line of an amplifier for the lower significant outputs.

The input lines L1 to L3 have been biased via the biasing transistors to the weighting values 1,2,4, respectively, and the weighting value of the MSB output is fedback to the input line of the LSB by the conductance value of the NMOS transistor based upon the output status of the MSB output.

On the other hand, the conductance value of all PMOS transistors is set to a weighting value of "1".

The geometric parameter W/L, which is a ratio of the channel width W to the length L of the MOS transistor, specifies the conductance of the MOS transistor.

For a fixed channel length L, the conductance is proportional to the channel width W.

The conductance value "1" represents the case that in the PMOS transistor, the width W is 5 $\mu$m and the length L is 2 $\mu$m, and in the NMOS transistor, the W to L ratio is W/L=2 $\mu$m/2 $\mu$m.

Therefore, if the summed conductance value of all PMOS transistors connected to one input line is identical to the summed conductance value of all NMOS transistors, the conductance of the NMOS transistors is greater than that of the PMOS transistor and thus, the input line will be negative.

Each value 1,2,4 of the NMOS transistor in shown FIG. 1 represent the case that the W/L ratio is 2/2, 4/2, 8/2 in the conductance value, respectively.

The total conductance values of each input line L1-L3 are determined by the difference between the total conductances of the PMOS and transistors the total conductances of the NMOS transistors.

At this time, if the difference is positive, the output of the amplifier is "1", and if the difference is negative, the output is "0".

The output of each amplifier is inverted by a inverter and applied to the output terminals out1-out3.

Accordingly, the input/output transfer function is defined as following UFT neural model circuit:

$$Voi = f(\hat{Voi})$$

$$\hat{Voi} = \sum_{j=1}^{n} Tij \cdot Vj + \sum_{k=1}^{m} Tik \cdot Vk + 1 - 2^{i-1}$$

where

Vj indicates input voltage,

Vk indicates output voltage,

Tij indicates the connecting weight between the jth input line of an ith amplifier and has a constant value of "1", and Tik indicates the connecting weight in which the output of a kth amplifier is fedback to the input line of the ith amplifier.

In the embodiment, Tij is as follows $$Tij = \begin{bmatrix} -2^{k-1} & (\text{if } k > i) \\ 0 & (\text{if } k \leq i) \end{bmatrix}$$

Also, in the above equation, $1-2^{i-1}$ indicates a biasing connecting weight of the input line of the ith amplifier.

The output state according to the number of "1" which is applied to the input trminals IN 1 to IN 7 in the above equation of the 7 to 3, 1's counter shown in FIG. 1 will be described.

First, when a "0" is input to all input terminals, all PMOS transistors are turned on and the total conductances of the input lines of the amplifiers are positive values. Accordingly, the outputs of the amplifiers U1–U3 are "1" and the values of output terminals are all "0". On the contrary, when a "1" is input to all input terminals, all PMOS transistors are turned off and the total conductances of the input lines of the amplifiers are negative values. Accordingly, the values of the output terminals OUT1–OUT3 are all "1".

Figure 2:
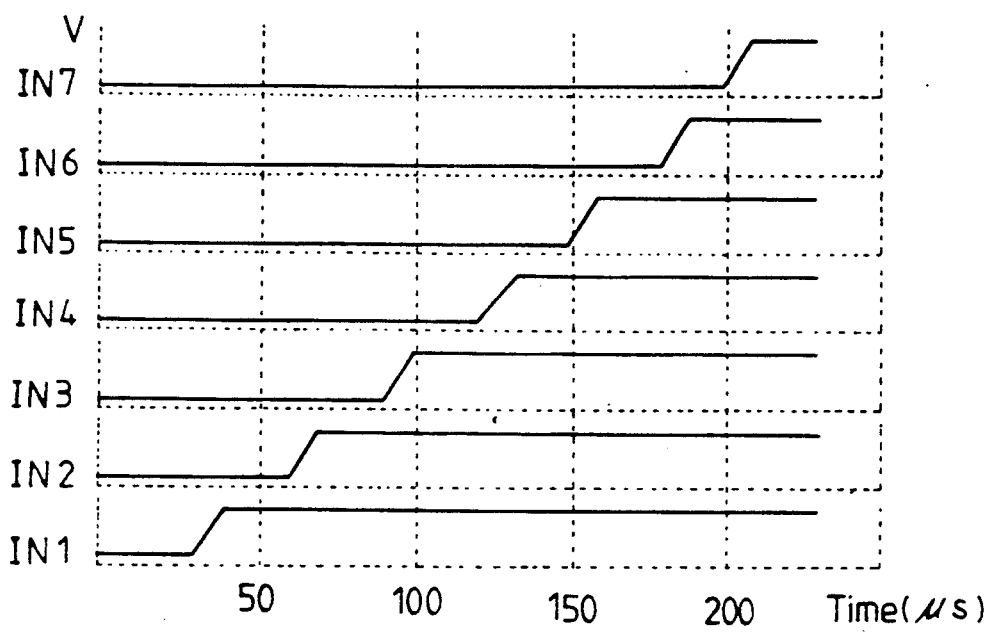
Figure 3:
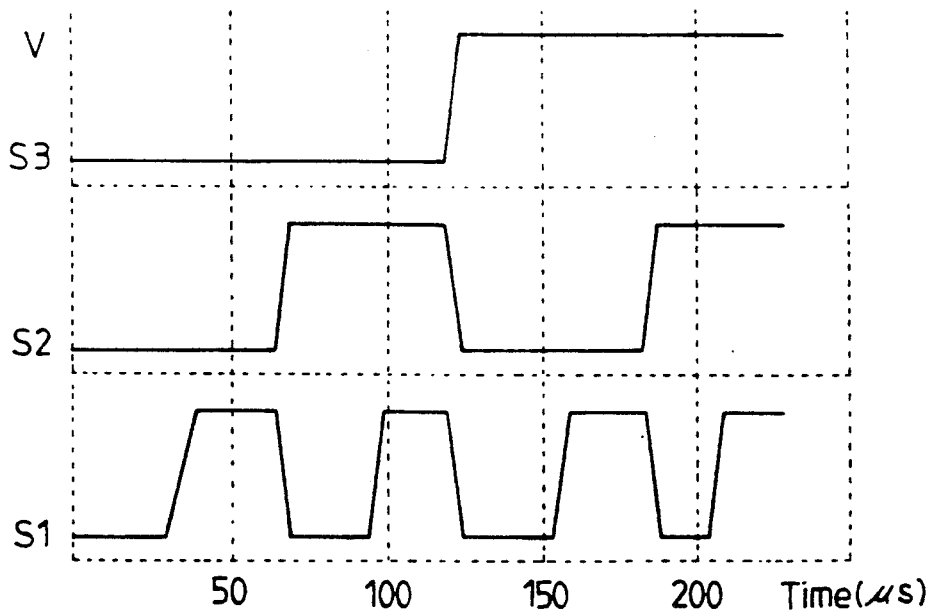
FIG. 3 shows the output wave form of the 1's counter shown in FIG. 1.

FIGS. 2 and 3 show the input and output wave forms of the 7 to 3 1's counter, respectively.

Figure 4:
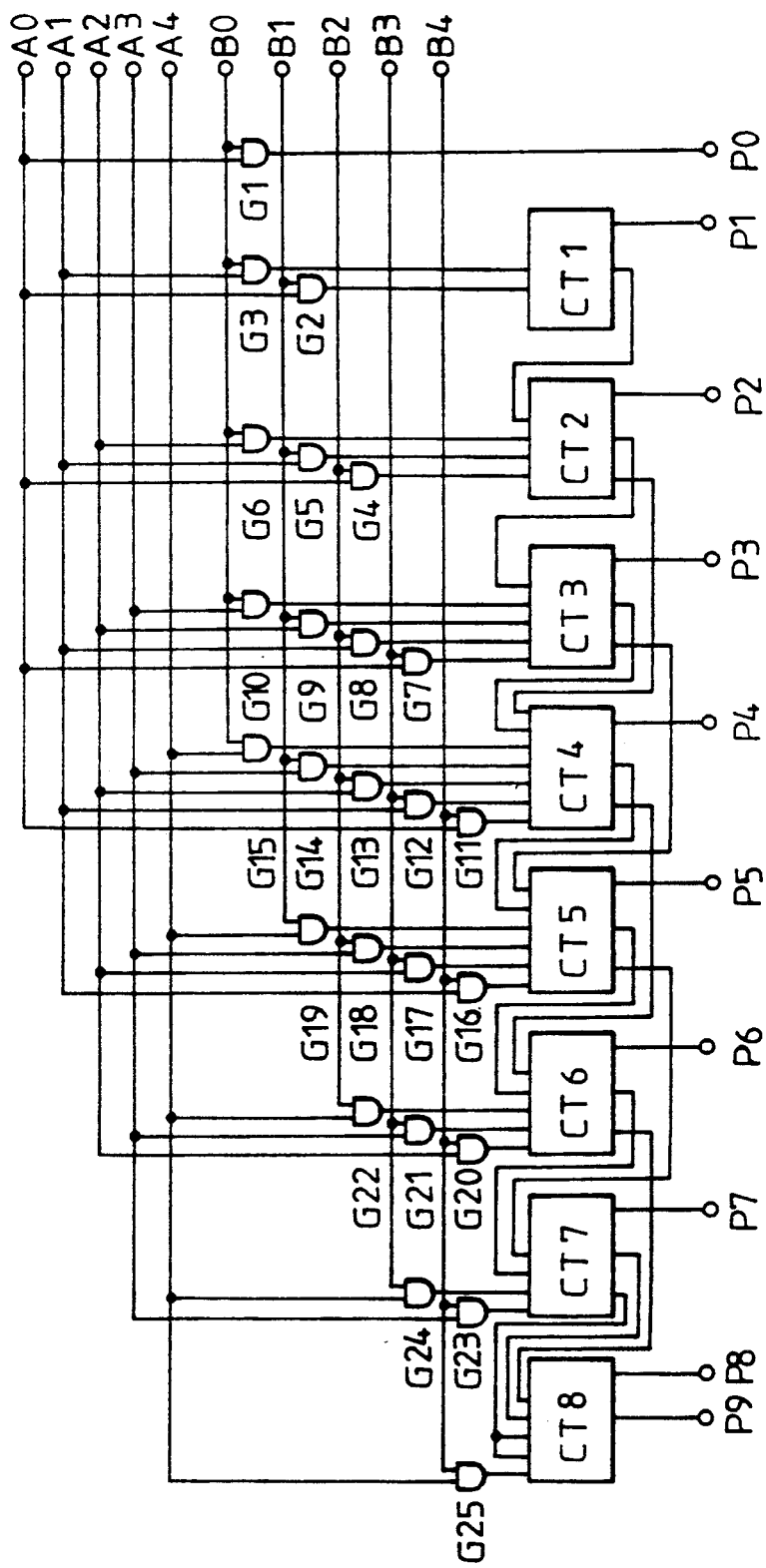
FIG. 4 shows the digital multiplier of the preferred embodiment according to the invention.

FIG. 4 shows a detailed circuit of the 5×5 digital multiplier of the preferred embodiment according to the present invention.

In FIG. 4, the partial products in the multiplication process is composed of AND gates G1–G25, while carries are composed of 7 to 3 1's counters CT1–CT8.

The least significant digit P0 is simply calculated by the AND gate G1 which performs the sum of the LSB A0 of the multiplicand and the LSB B0 of the multiplier.

The P1 stage of the multiplier is calculated by the LSB of the counter CT1 to which the output of the AND gates G2 and G3 are inputted in parallel and said gates performing A0×B1, A1×B0, respectively.

The P2 stage of the multiplier is calculated by the LSB of the counter CT2 to which the outputs of the AND gates G4 through G6 which perform A0×B2, A1×B1, A2×B1, A3×B0, and the second bit of the 1's counter CT1 are inputted in parallel.

The P3 stage of the multiplier is calculated by the LSB of the counter CT3 to which the outputs of the AND gates G7 through G10 which perform A0×B3, A1×B2, A2×B1, A3×B0, respectively, and the second bit of the 1's counter CT2 are inputted in parallel.

The P4 stage of the multiplier is calculated by the LSB of the counter CT4 to which the outputs of the AND gates G11 through G15 which perform A0×B4, A1×B2, A3×B1, and A4×B0, respectively, and the second bit of the counter CT3 are inputted in parallel.

The P5 stage of the multiplier is calculated by the LSB of the 1's counter CT5 to which the outputs of the AND gates G16 through G19 which perform A1×B4, A2×B3, A3×B2, A4×B1, respectively, and the most significant bit of the 1's counter CT3, and the second bit of the 1's counter CT5 are inputted in parallel to one another.

The P6 stage of the multiplier is calculated by the LSB of the 1's counter CT6 to which the outputs of the AND gates G20 through G22 which perform A2×B4, A3×B3, A4×B2, respectively, and the MSB of the 1's counter CT4, and the second bit of the counter CT5 are inputted in parallel to one another.

The P7 stage of the multiplier is calculated by the LSB of the 1's counter CT7 to which the outputs of AND gates G23 and G24 which perform A3×B4, A4×B3, respectively, the MSB of the 1's counter CT5 and the second bit of the counter CT6 are inputted in parallel to one another.

The P8 and P9 stages of the multiplier is calculated by the LSB and the second bit of the 1's counter CT8 to which the outputs of the AND gate G25 which performs A4×B4, and the second bit and the MSB of the counter CT7 are inputted in parallel.

As mentioned above, the digital multiplier according to the present invention is composed of only the AND gates and the 1's counters using UFT neural network, so that the multipliers can be simplified in the architecture and used in high speed digital signal processing systems.

In the preferred embodiment, when the difference of the total conductance between PMOS and NMOS transistor is same number, the geometric aspect ratio W/L of the transistors is specified as the 5/2 and 2/2 so that in the ratio NMOS transistors are greater than PMOS transistors.

However, if desired, it is noted that the parameter W/L may be 6/2 to 2/2 by removing the biasing PMOS transistor so that the PMOS transistors are greater than the NMOS transistor when the difference of the total conductance between PMOS and NMOS transistors is the same number.

Furthermore, although in the embodiment the multiplier has been described only the 5×5 digital multiplier, the principles described here may be extended to an N×N digial multiplier.

For example, it is contemplated that a 12×12 digital multiplier may be implemented using 144 AND gates and ten 15 to 4 1's counter.

What is claimed is:

1. A digital multiplier for multiplying a first binary N bit number to a second binary N bit number to obtain a final binary number, comprising:

multiplying means for multiplying each bit of the first N bit number by each bit of the second N bit number, and for outputting in parallel partial products indicative of the multiplication, said partial products being one of a binary "1" and "0";

a plurality of 1's counters adjacently aligned from least significance to most significance, each of said 1's counters receiving at least one partial product output from the multiplying means and counting a number of the binary "1"s, each of said 1's counters also outputting one bit of the final binary number and outputting at least one carry bit to the adjacent 1's counter of more significance, each of said 1's counters comprising:

a plurality of input lines;

a plurality of lines intersecting said input lines at intersections;

a plurality of PMOS transistors coupled between said input lines and said lines at ones of said intersections;

a plurality of biasing NMOS transistors coupled between said input lines and said lines at other ones of said intersections;

a plurality of amplifiers coupled to corresponding ones of said lines, said amplifiers being arranged from least significance to most significance and having respective outputs; and a plurality of feedback NMOS transistors coupled between said lines of said lower significant amplifiers and said outputs of said higher significant amplifiers.

2. A digital multiplier according to claim 1, wherein each of said PMOS transistors at said one intersections couples a first power source to the line at the corresponding one intersection, in accordance with an input on said input line at the corresponding one intersection.

3. A digital multiplier according to claim 2, wherein each of said PMOS transistors has a source coupled to the first power source, a drain coupled to said line at the corresponding one intersection, and a gate coupled to said input line at the corresponding one intersection.

4. A digital multiplier according to claim 1, wherein each of said biasing NMOS transistors at said other intersections couples a second power source to the line at the corresponding other intersection, in accordance with an input on said input line at the corresponding other intersection.

5. A digital multiplier according to claim 4, wherein each of said biasing NMOS transistors has a source coupled to the second power source, a drain coupled to said line at the corresponding other intersection, and a gate coupled to said input line at the corresponding other intersection.

6. A digital multiplier according to claim 1, wherein each of said feedback NMOS transistors couples a second power source to a line of one of said lower significant amplifiers in accordance with a feedback from an output of one of said higher significant amplifiers.

7. A digital multiplier according to claim 6, wherein each of said feedback NMOS transistors has a source coupled to the second power source, a drain coupled to said line of said one lower significant amplifier, and a gate coupled to said output fedback from said one higher significant amplifier.

8. A digital multiplier according to claims 2, 3, 4, 5, 6 or 7, wherein said first power source is a driving voltage of a MOS transistor, and said second power source is a ground.

9. A digital multiplier according to claim 1, wherein said PMOS transistors and said biasing and feedback NMOS transistors have conductances such that for the same conductance values, said NMOS transistors have a conductance greater than that of said PMOS transistors.

10. A digital multiplier according to claim 1, wherein said PMOS transistors have a channel width to channel length geometry of 5 $\mu$m/2 $\mu$m and said biasing and feedback NMOS transistors have a width to length geometry of 2 $\mu$m/2 $\mu$m.

11. A digital multiplier according to claim 1, wherein said amplifiers comprise two serially connected CMOS inverters.

12. A digital multiplier according to claim 1, further comprising a plurality of CMOS inverters coupled to corresponding ones of said outputs of said amplifiers.

13. A digital multiplier according to claim 1, wherein each of said 1's counters is defined by the following unidirectional type neural network:

$$Voi = \sum_{j=1}^{n} Tij \cdot Vj + \sum_{k=1}^{m} Tik \cdot Vk + 1 - 2^{i-1}$$

where
- Vj represents input voltage,
- Vk represents output voltage,
- Tij represents a connecting weight between a jth input line and ith amplifier, and has a constant value of "1"; and
- Tik represents a connecting weight in which a kth output is fedback to the ith amplifier as defined as follows:

$$\begin{bmatrix} -2^{k-1} & (\text{if } k > i) \\ 0 & (\text{if } k \leq i) \end{bmatrix}$$

14. A digital multiplier for multiplying a first binary N bit number to a second binary N bit number to obtain a final binary number indicative of the multiplication, comprising:

multiplying means for multiplying each bit of the first N bit number by each bit of the second N bit number, and for outputting in parallel partial products indicative of the multiplication, said partial products being one of a binary "1" and "0";

a plurality of 1's counters adjacently aligned from least significance to most significance, each of said 1's counters receiving at least one partial product output from the multiplying means and counting a number of the binary "1"s, each of said 1's counters also outputting one bit of the final binary number and outputting at least one carry bit to the adjacent 1's counter of more significance, each of said 1's counters being defined by the following unidirectional type neural network:

$$Voi = \sum_{j=1}^{n} Tij \cdot Vj + \sum_{k=1}^{m} Tik \cdot Vk + 1 - 2^{i-1}$$

where
- Vj represents input voltage,
- Vk represents output voltage,
- Tij represents a connecting weight between a jth input line and ith amplifier, and has a constant value of "1"; and
- Tik represents a connecting weight in which a kth output is fedback to the ith amplifier as defined as follows:

$$\begin{bmatrix} -2^{k-1} & (\text{if } k > i) \\ 0 & (\text{if } k \leq i) \end{bmatrix}$$

* * * * *